United States Patent
Akiyama et al.

[11] Patent Number: 5,815,342
[45] Date of Patent: Sep. 29, 1998

[54] PERPENDICULAR MAGNETIC RECORDING/REPRODUCING APPARATUS

[75] Inventors: Junichi Akiyama; Yoichiro Tanaka, both of Kawasaki, Japan

[73] Assignee: Kabushiki Kaisha Toshiba, Kawasaki, Japan

[21] Appl. No.: 558,971

[22] Filed: Nov. 13, 1995

Related U.S. Application Data

[63] Continuation of Ser. No. 90,312, Jul. 13, 1993, abandoned.

[30] Foreign Application Priority Data

| Jul. 13, 1992 | [JP] | Japan | 4-184254 |
| Aug. 26, 1992 | [JP] | Japan | 4-226582 |

[51] Int. Cl.$^6$ ..................................................... G11B 5/66
[52] U.S. Cl. ............... 360/97.01; 360/103; 360/113; 360/122; 360/135; 428/65.3; 428/457; 428/611; 428/668; 428/692; 428/694 TM; 428/694 TS; 428/900
[58] Field of Search ..................... 428/694 R, 694 T, 428/694 TB, 694 TM, 900, 64.2, 65.3, 694 BM, 694 TS, 694 BS, 66.6, 66.7, 692, 611, 668, 457; 360/110, 131, 134, 135, 136, 113, 122, 103, 97.01

[56] References Cited

U.S. PATENT DOCUMENTS

| 4,621,030 | 11/1986 | Uesaka et al. | 428/607 |
| 4,657,819 | 4/1987 | Funaki | 428/458 |
| 4,677,032 | 6/1987 | Robinson | 428/611 |
| 4,677,512 | 6/1987 | Akiyama et al. | 360/110 |
| 4,700,252 | 10/1987 | Muraoka et al. | 360/113 |
| 4,731,300 | 3/1988 | Watanabe et al. | 428/636 |
| 4,745,510 | 5/1988 | Watanabe et al. | 360/131 |
| 4,839,761 | 6/1989 | Gatzen | 360/113 |
| 4,954,920 | 9/1990 | Yamada et al. | 360/113 |

FOREIGN PATENT DOCUMENTS

| 3-53686 | 8/1991 | Japan . |
| 4-59685 | 12/1992 | Japan . |

*Primary Examiner*—Stevan A. Resan
*Attorney, Agent, or Firm*—Oblon, Spivak, McClelland, Maier & Neustadt, P.C.

[57] ABSTRACT

Disclosed is a perpendicular magnetic recording/reproducing apparatus comprising perpendicular magnetic recording media and magnetic heads. Each perpendicular magnetic recording medium has a substrate, a soft magnetic back layer and a magnetic recording layer with a perpendicular magnetic anisotropy both formed on the substrate. Each magnetic head has at least one magnetic field generating element capable of applying a magnetic field to a given region of the soft magnetic back layer at a time of signal reproduction, for performing recording and reproducing of magnetized signals with respect to the associated perpendicular magnetic recording media, whereby Barkhausen noise is reduced. The perpendicular magnetic recording medium may further include a bias-field applying layer formed on at least a substrate side surface of the soft magnetic back layer. Each perpendicular magnetic recording medium may further have the bias-field applying layer formed between the substrate and the high-permeability magnetic layer.

9 Claims, 8 Drawing Sheets

PERPENDICULAR MAGNETIC RECORDING/REPRODUCING APPARATUS

This application is a Continuation of application Ser. No. 08/090,312, filed on Jul. 13, 1993, now abandoned.

BACKGROUND OF THE INVENTION

1. Field of the Invention

The present invention relates to a perpendicular magnetic recording/reproducing apparatus which is used for a magnetic disk drive or VTR.

2. Description of the Related Art

Recently, magnetic recording/reproducing apparatuses such as hard disk drives have become very popular as a random access external storage device of a large capacity computer file. As the use of magnetic recording/reproducing apparatuses increases, there is increasing demands for a larger storage capacity and a higher recording density for the magnetic recording/reproducing apparatuses. To meet the demand for a higher recording density, magnetic recording/reproducing apparatuses have been studied and developed in various fields.

In a typical hard disk drive, a plurality of disks each having a magnetic layer deposited on a disk-shaped non-magnetic substrate are provided one on another in a cylinder form. A recording/reproducing magnetic head is placed over each disk surface via its arm and is a type designed to be positioned by its associated actuator. In recording or reproducing information by this type of hard disk drive, magnetic heads do not directly contact the surfaces of the associated disk surfaces which rotate at a high speed, but are so arranged as to be able to access desired positions on the disk surfaces while slightly floating above the associated disk surfaces. Then, each magnetic head records signals on, or reproduces signals from, tracks formed concentrically on the disk surface.

To meet the demand for a larger storage capacity in the above-described hard disk drive, various attempts have been made; for example, for increasing the recording density by increasing the linear recording density of a disk or the density in the track direction, and improving the recording density by increasing the track density. Recently, to further improve the recording density, contact recording to record or reproduce signals with a head nearly in contact with a target recording medium has been studied and developed actively.

A perpendicular magnetic recording system is known as one way to improve the linear recording density.

The perpendicular magnetic recording system in principle has a very small demagnetizing field at the magnetic transition, narrowing the magnetic transition width, as compared with the conventional longitudinal magnetic recording system which is anisotropic in the longitudinal direction. The perpendicular magnetic recording system can therefore record signals at a high density. It is known that the perpendicular magnetic recording system can provide more perpendicular recorded magnetic fields through a perpendicular magnetic head that uses a rectangular soft magnetic thin film of a rectangular shape, and is thus effective in providing a higher density.

To increase the recording and reproducing efficiencies and provide sharper magnetic transition, a perpendicular magnetic recording medium has been proposed and developed, which has a perpendicular double-layer structure having a soft magnetic back layer provided under a perpendicular anisotropic layer. The perpendicular magnetic recording medium with the perpendicular double-layer structure can reduce the demagnetizing field at the tip of the magnetic head to acquire a larger generated magnetic field by the magnetic interaction between the magnetic head and soft magnetic back layer. As this perpendicular magnetic recording medium has a smaller demagnetizing field at the tip of the magnetic head at the time of reproduction, the effective magnetic permeability becomes greater and the magnetic flux from the recording medium is efficiently collected by the magnetic head. It is therefore possible to acquire a large signal.

When the soft magnetic back layer is used in the perpendicular magnetic recording medium with the perpendicular double-layer structure, the magnetic domain wall in the soft magnetic layer discontinuously shifts at the time of reproducing a signal due to the contact pressure of the magnetic head or a small magnetic field from the head magnetized by the reproduction magnetic flux, thus causing spike noise. This noise considerably reduces the signal quality. Therefore, it is desirable to reduce the coercive force of the soft magnetic back layer. As the coercive force of the soft magnetic back layer becomes smaller (the permeability of the soft magnetic back layer becomes greater. Thus, the soft magnetic back layer is also a high-permeability magnetic layer and these terms will be used interchangeably throughout the specification), the recording/reproducing efficiency can be increased by the magnetic interaction between the magnetic head and the soft magnetic back layer. When the soft magnetic characteristic of the soft magnetic back layer is improved, (i.e., the coercive force reduced) the magnetic domain wall also becomes easy to move, thus causing spike noise during signal reproduction. This reduces the signal quality and increases the error rate, reducing the reliability.

It is confirmed that the spike noise will not be observed when signal recording/reproduction is carried out with respect to a recording medium with a single layer structure having only a perpendicular magnetization layer. Therefore, the spike noise occurs only by the high-permeability magnetic layer, not by the interaction between the high-permeability magnetic layer and the perpendicular magnetization layer deposited thereon. Also, the spike noise does not occur uniformly in the recording medium. In other words, there is a region where the spike noise occurs and a region where this noise does not occur. In the former spike-noise region, the magnetic domain wall is generated frequently, whereas in the latter region where the spike noise does not occur, no magnetic domain wall is generated. This spike noise is originated from the irreversible transition of the magnetic domain wall and is generally called Barkhausen noise.

It is apparent from the above discussion that the generation of the magnetic domain wall in the high-permeability magnetic layer should be suppressed to suppress the generation of Barkhausen noise. There is a known method of effectively suppressing the generation of this Barkhausen noise. This method utilizes the exchange coupling produced at the interface between the ferromagnetic material and antiferromagnetic material to apply a bias field to the high-permeability magnetic layer, thus suppressing the generation of the magnetic domain wall in the high-permeability magnetic layer (as disclosed in Japanese Examined Patent Publication No. 3-53686). This perpendicular magnetic recording medium comprises a high-permeability magnetic layer formed on the substrate, an antiferromagnetic layer formed on this high-permeability magnetic layer, and a perpendicular magnetization layer formed on the antiferromagnetic layer. The generation of Barkhausen noise is actually suppressed at the time of recording or reproducing signals on or from the thus constituted perpendicular magnetic recording medium.

As this structure has the antiferromagnetic layer formed between the perpendicular magnetization layer and high-permeability magnetic layer, the thickness of the antiferromagnetic layer causes an interlayer (or intermediate layer) originated spacing loss at the time of signal recording/reproduction. This structure therefore reduces the recording and reproducing efficiencies and the recording resolution, and gives insufficient sensitivity and resolution at the time of signal recording/reproduction while suppressing the Barkhausen noise.

SUMMARY OF THE INVENTION

It is therefore an object of the present invention to provide a perpendicular magnetic recording/reproducing apparatus which can suppress Barkhausen noise and ensure a high sensitivity and high resolution.

To achieve the foregoing and other objects and in accordance with the purpose of the present invention, according to the first aspect of the present invention, there is provided a perpendicular magnetic recording/reproducing apparatus comprising perpendicular magnetic recording media each having a substrate, a soft magnetic back layer and a magnetic recording layer with a perpendicular magnetic anisotropy both formed on the substrate; and magnetic heads each having at least one magnetic field generating element capable of applying a magnetic field to a given region of the soft magnetic back layer at a time of signal reproduction, for performing recording and reproducing of magnetized signals with respect to the associated perpendicular magnetic recording media, whereby Barkhausen noise is reduced.

The magnetic field generating element may be designed to produce a magnetic field for making the intensity of the magnetic field in the soft magnetic back layer greater than a coercive force of the soft magnetic back layer and making the intensity of the magnetic field in the magnetic recording layer smaller than a perpendicular coercive force of the magnetic recording layer.

The magnetic field generating element may be constituted of a conductor with a cross-sectional area S, and a current density J of a current flowing through the magnetic field generating element satisfies $$J > 2\pi dHc/S$$

where d is a distance from the center of the current with the current density J to the soft magnetic back layer and Hc is a coercive force of the soft magnetic back layer.

According to the first perpendicular magnetic recording/reproducing apparatus, the sense current flowing through the magnetic head at the time of signal reproduction generates an in-plane magnetic field in the soft magnetic back layer lying directly below the magnetic head to fix the magnetic domain wall of the soft magnetic back layer or remove the magnetic domain wall by applying the magnetic field in one direction. Therefore, the present invention can suppress the shifting of the magnetic domain wall of the soft magnetic back layer without influencing the recording magnetization of the perpendicular magnetic anisotropic layer and, therefore, can suppress the generation of Barkhausen noise by the abrupt shifting of the magnetic domain wall.

Further, a magnetic field greater than the coercive force Hc of the soft magnetic back layer is applied to the soft magnetic back layer, the magnetic domain wall in the soft magnetic back layer located around the head reproducing element is fixed, preventing abrupt shifting of the magnetic domain wall in a region immediately below the head where the head reproducing element has the highest reproducing sensitivity. The applied magnetic field is a DC magnetic field generated by a DC current or a hard magnetic film, or an AC magnetic field generated by an AC current. When an AC magnetic field, particularly, a high-frequency magnetic field, is applied, the soft magnetic back layer which is originally a domain wall motion type, repeats magnetization inversion that is the property of a magnetization rotation type, making it difficult to shift the magnetic domain wall. By making the intensity of the applied magnetic field in the magnetic recording layer having a perpendicular anisotropy smaller than the coercive force of the magnetic recording layer, the applied magnetic field will not at all affect the magnetization of the magnetic recording layer carrying recorded signals.

Even with the use of a perpendicular magnetic recording medium having a soft magnetic back layer, the first perpendicular magnetic recording/reproducing apparatus of this invention can suppress the shift of the magnetic domain wall of the soft magnetic back layer at the time of signal reproduction, thereby effectively suppressing the occurrence of Barkhausen noise. The magnetization of the magnetic recording layer will not be affected at all by the applied magnetic field, so that the deterioration of the signal quality can be prevented. It is therefore possible to acquire high-quality reproduced signals with a large S/N ratio without impairing the high-density recording characteristic of perpendicular magnetic recording.

According to the second aspect of this invention, there is provided a perpendicular magnetic recording/reproducing apparatus comprising perpendicular magnetic recording media each having a substrate, a high-permeability magnetic layer formed on the substrate, a perpendicular magnetization layer formed on the high-permeability magnetic layer for magnetically recording signals, and a bias-field applying layer formed on at least that surface of the high-permeability magnetic layer which lies on a substrate side; and magnetic heads for performing recording and reproducing of magnetized signals with respect to the associated perpendicular magnetic recording media, whereby Barkhausen noise is reduced.

According to the second perpendicular magnetic recording/reproducing apparatus, the perpendicular magnetic recording medium includes the bias film, high-permeability magnetic layer and perpendicular magnetization layer sequentially formed on the substrate. Accordingly, the coupling acts at the interface between the bias film and high-permeability magnetic layer and a bias field is applied to the high-permeability magnetic layer, so that the generation of the magnetic domain wall in the high-permeability magnetic layer is suppressed, thus suppressing the occurrence of Barkhausen noise.

Further, according to the second perpendicular magnetic recording/reproducing apparatus, the high-permeability magnetic layer and perpendicular magnetization layer are formed in that order on the substrate and both end regions of the perpendicular magnetization layer (in the track width direction) are perpendicularly magnetized in the opposite directions. Those two end regions are magnetically coupled to the high-permeability magnetic layer, so that the magnetization in the high-permeability magnetic layer corresponding to the perpendicularly magnetized region is fixed in the track width direction (radial direction of the disk) and becomes difficult to shift. Consequently, a bias field is applied in the track width direction in that portion of the high-permeability magnetic layer which corresponds to the position of the recording/reproducing region between the perpendicularly magnetized regions in the perpendicular magnetization layer. This arrangement can suppress the generation of the magnetic domain wall in the high-permeability magnetic layer and suppress the occurrence of Barkhausen noise. In addition, the permeability in the lengthwise direction of the tracks (the circumferential direction of the disk) in that area of the high-permeability magnetic layer which corresponds to the position of the recording/reproducing region of the perpendicular magnetization layer hardly decreases, so that the recording and reproducing efficiencies will not decrease.

Further, as no interlayer (or intermediate layer) is present between the perpendicular magnetization layer and high-permeability magnetic layer, there is no interlayer originated spacing loss at the time of signal recording/reproduction, thus ensuring high recording and reproducing efficiencies and high resolution.

In summary, according to the second perpendicular magnetic recording/reproducing apparatus of this invention, the generation of the magnetic domain wall in the high-permeability magnetic layer can be suppressed and the occurrence of Barkhausen noise can be also suppressed effectively. As no interlayer, like an antiferromagnetic layer, is present between the perpendicular magnetization layer and high-permeability magnetic layer, the thickness of the antiferromagnetic layer will not cause an interlayer originated loss at the time of signal recording/reproduction. This allows a perpendicular magnetic recording/reproducing apparatus with high recording and reproducing efficiencies and high resolution to be accomplished.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Preferred embodiments of the present invention will now be described referring to the accompanying drawings.

Figure 1:
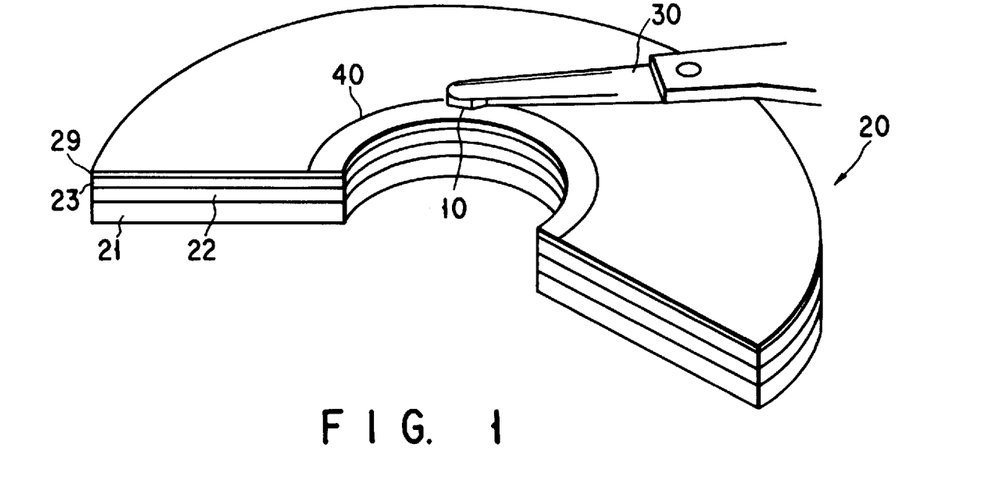
FIG. 1 is a partly cross-sectional perspective view schematically illustrating the structure of a perpendicular magnetic recording/reproducing apparatus according to a first embodiment of the present invention.

FIG. 1 presents a partly cross-sectional perspective view schematically illustrating the structure of a perpendicular magnetic recording/reproducing apparatus according to the first embodiment of the present invention. The perpendicular magnetic recording/reproducing apparatus of this embodiment comprises magnetic heads 10 and perpendicular magnetic recording media 20.

Each magnetic head 10 is a magnetoresistive element (MR element) formed of a Permalloy thin film, 0.02 $\mu$m thick and 3 $\mu$m high, to reproduce signals magnetically recorded on the perpendicular magnetic recording medium 20. The magnetic head 10 is provided in non-contact with the perpendicular magnetic recording medium 20 via an arm 30. The magnetic head 10 is positioned, by an actuator (not shown), onto desired tracks 40 formed concentric on the perpendicular magnetic recording medium 20.

The perpendicular magnetic recording medium 20 has a first magnetic layer which is referred to as a soft magnetic back layer 22 (which may be called "highly permeable magnetic layer" hereinafter), a second magnetic layer which is referred to as a magnetic recording layer 23 (which may be called "perpendicular magnetic anisotropic layer" or "perpendicular magnetization layer" hereinafter) having a perpendicular magnetic anisotropy formed on a non-magnetic disk-shaped substrate 21 in order, with a protective layer 29 formed on the resultant structure.

The soft magnetic back layer 22 of CoZrNb amorphous thin film was formed 0.1 μm thick on the glass substrate 21, 1.8 inch in diameter and 0.4 mm thick, under an argon gas atmosphere by high-frequency sputtering. The in-plane coercive force Hcs of the soft magnetic back layer 22 was 10 Oe in this case. The magnetic recording layer 23 of CoPt having a perpendicular magnetic anisotropy was formed 0.07 μm thick on the soft magnetic back layer 22 under an argon gas atmosphere by DC magnetron sputtering. The perpendicular coercive force Hch of the magnetic recording layer 23 was 2000 Oe. The protective layer 29 of hard carbon was formed 0.01 μm on the magnetic recording layer 23 by Electron Cyclotron Resonance (ECR) sputtering to secure a durability against the head contact.

Figure 2:
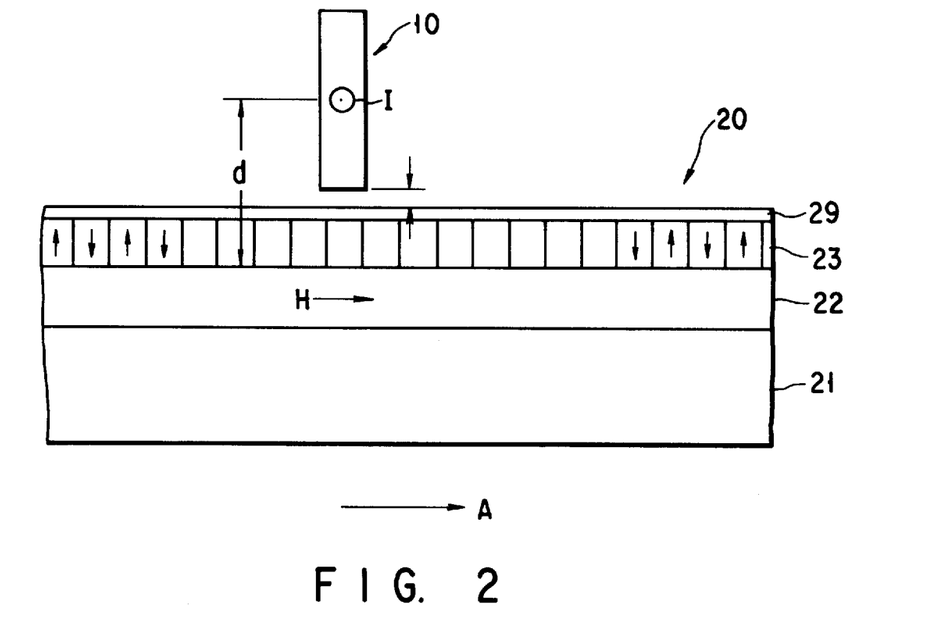
FIG. 2 is an exemplary diagram showing a perpendicular cross section in the direction of the relative movement of the head and medium in FIG. 1.

FIG. 2 presents an exemplary diagram showing a vertical cross section in the direction of the relative movement of the head and medium in FIG. 1.

The perpendicular magnetic recording medium 20 rotates in the direction of an arrow A in the diagram. The cross-sectional area S of the magnetic head 10 is $6 \times 10^{-14} m^2$, the distance between the magnetic head 10 and the protective layer 29 on the perpendicular magnetic recording medium 20 is 0.01 μm. A sense current I with a current density J was supplied to the magnetic head 10 in the width direction of the tracks (the direction perpendicular to the drawing sheet) at the time of signal reproduction. The current density J, the cross-sectional area S and the sense current I have a relation of J=I/S. This sense current I serves to transform a change in resistance of the MR element and to apply a magnetic field H to the soft magnetic back layer 22. The distance d from the center of the sense current I flowing through the magnetic head 10, which serves as a magnetic field generating element, to the surface of the soft magnetic back layer 22 was 1.59 μm. The sense current I was set to $2 \times 10^{11}$ A/m² so that the current density J of the current flowing through the magnetic head 10 satisfies the following relation $$J > 2\pi d Hc/S \quad \ldots (1)$$

i.e., the current density J becomes $1.33 \times 10^{11}$ A/m² or greater.

The sense current I flowing through the magnetic head 10 of the thus constituted perpendicular magnetic recording/reproducing apparatus generates an in-plane magnetic field H in the soft magnetic back layer 22 lying directly below the magnetic head 10. The magnetic domain wall of the soft magnetic back layer 22 is fixed by this magnetic field or removed by magnetizing the domain wall in one direction. Therefore, the shifting of the magnetic domain wall of the soft magnetic back layer 22 can be suppressed without influencing the recording magnetization of the perpendicular magnetic anisotropic layer 23, thus suppressing the generation of Barkhausen noise due to the abrupt shift of the magnetic domain wall. This can improve the quality of reproduced signals.

When an AC current or the sense current I of a frequency of 1 MHz is supplied to the magnetic head 10 to apply a high-frequency magnetic field, the soft magnetic back layer 22 which is originally a wall motion type, repeats magnetization inversion that is the property of a magnetization rotation type, making it difficult to shift the magnetic domain wall. Accordingly, the occurrence of Barkhausen noise can be suppressed.

Since the intensity of the magnetic field in the perpendicular magnetic anisotropic layer 23 at the time of signal reproduction is 16 Oe, considerably smaller than the coercive force of the perpendicular magnetic anisotropic layer 23, Hch=2000 Oe, recording magnetization will not be affected.

Table 1 shows the ratios of the reproduced signal output and the amplitude of Barkhausen noise from the soft magnetic back layer 22 while changing $J/(2\pi d Hc/S)$ with the current density J of the current flowing through the magnetic head 10 taken as a parameter.

TABLE 1

| $J/(2\pi d Hc/S)$ | Ratio of Reproduced Signal Output to Amplitude of Barkhausen Noise |
|---|---|
| 3.00 | 0.014 |
| 1.50 | 0.021 |
| 1.10 | 0.045 |
| 0.90 | 0.150 |
| 0.50 | 0.240 |

It is apparent from Table 1 that as the current density J of the current flowing through the magnetic head 10 increases to increase $J/(2\pi d Hc/S)$, the amplitude ratio of Barkhausen noise decreases, thus improving the signal quality. When $J/(2\pi d Hc/S)$ increases above 1 to satisfy the equation (1), in particular, Barkhausen noise is suppressed rapidly and falls below 0.05, a target value at which the recording/reproducing apparatus functions without causing any error.

Figure 3:
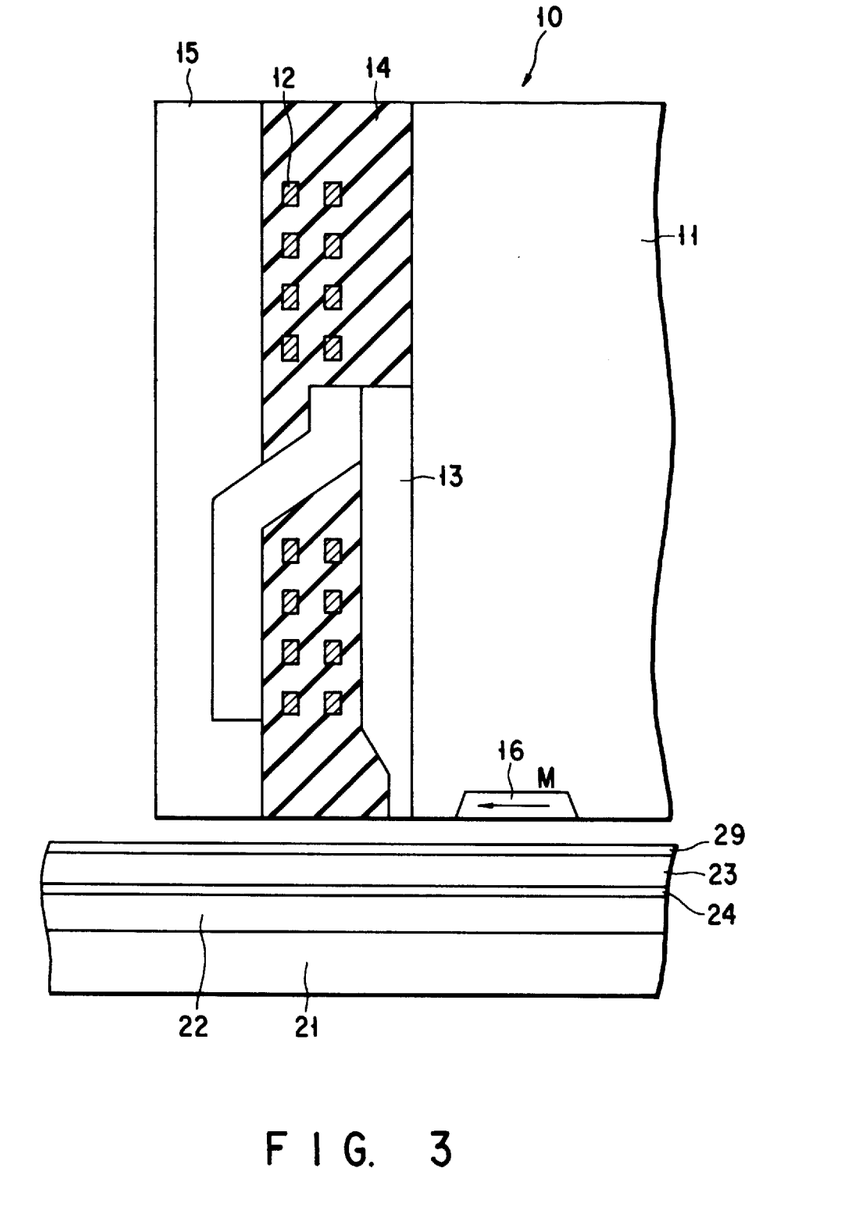
FIG. 3 is a vertical cross-sectional view schematically illustrating the structure of a perpendicular magnetic recording/reproducing apparatus according to a second embodiment of the present invention.

FIG. 3 presents a vertical cross-sectional view schematically illustrating the structure of a perpendicular magnetic recording/reproducing apparatus according to the second embodiment of the present invention.

The magnetic head for reproducing signals magnetically recorded on the perpendicular magnetic recording medium 20 is an inductive perpendicular magnetic head. More specifically, the magnetic head 10 has a magnetic pole 13 with a winding 12, provided on one side surface of a base 11. Those components are sealed with an insulating layer 14 and a protective resin 15. The magnetic pole 13 is formed of an FeSiN high-permeability magnetic film. A hard magnetic material 16 of SmCo is so fitted at the bottom of the base 11 as not to contact the magnetic pole 13. This hard magnetic material 16 is magnetized with magnetization M, nearly parallel to the surface of the perpendicular magnetic recording medium 20.

The soft magnetic back layer 22 of FeSi in the perpendicular magnetic recording medium 20 was formed 0.12 μm thick on the glass substrate 21, 2.5 inch in diameter and 0.635 mm thick, under an argon gas atmosphere by DC magnetron sputtering. The in-plane coercive force Hcs of the soft magnetic back layer 22 was 6 Oe in this case. The magnetic recording layer 23 of a CoCr alloy having a perpendicular magnetic anisotropy was formed 0.1 μm thick on the soft magnetic back layer 22 on an interlayer 24 of a sputter carbon of 0.04 μm thick under an argon gas atmosphere by DC magnetron sputtering. The perpendicular coercive force Hch of this magnetic recording layer 23 of CoCr was 1600 Oe. The protective layer 29 of SiN was formed 0.005 μm on the magnetic recording layer 23 by RF sputtering to secure a durability against the head contact.

With the above-described structure, the hard magnetic material 16 with magnetization M applies a magnetic field to the soft magnetic back layer 22, thus suppressing the shifting of the magnetic domain wall as in the first embodiment. Accordingly, the occurrence of Barkhausen noise due to the shifting of the magnetic domain wall of the soft magnetic back layer 22 can be suppressed, thus improving the signal quality.

Since the intensity of the applied magnetic field in the soft magnetic back layer 22 is about 30 Oe, higher than the coercive force Hcs of the soft magnetic back layer 22, the applied magnetic field will not affect at all the magnetization of the magnetic recording layer carrying recorded signals.

Figures 4, 5:
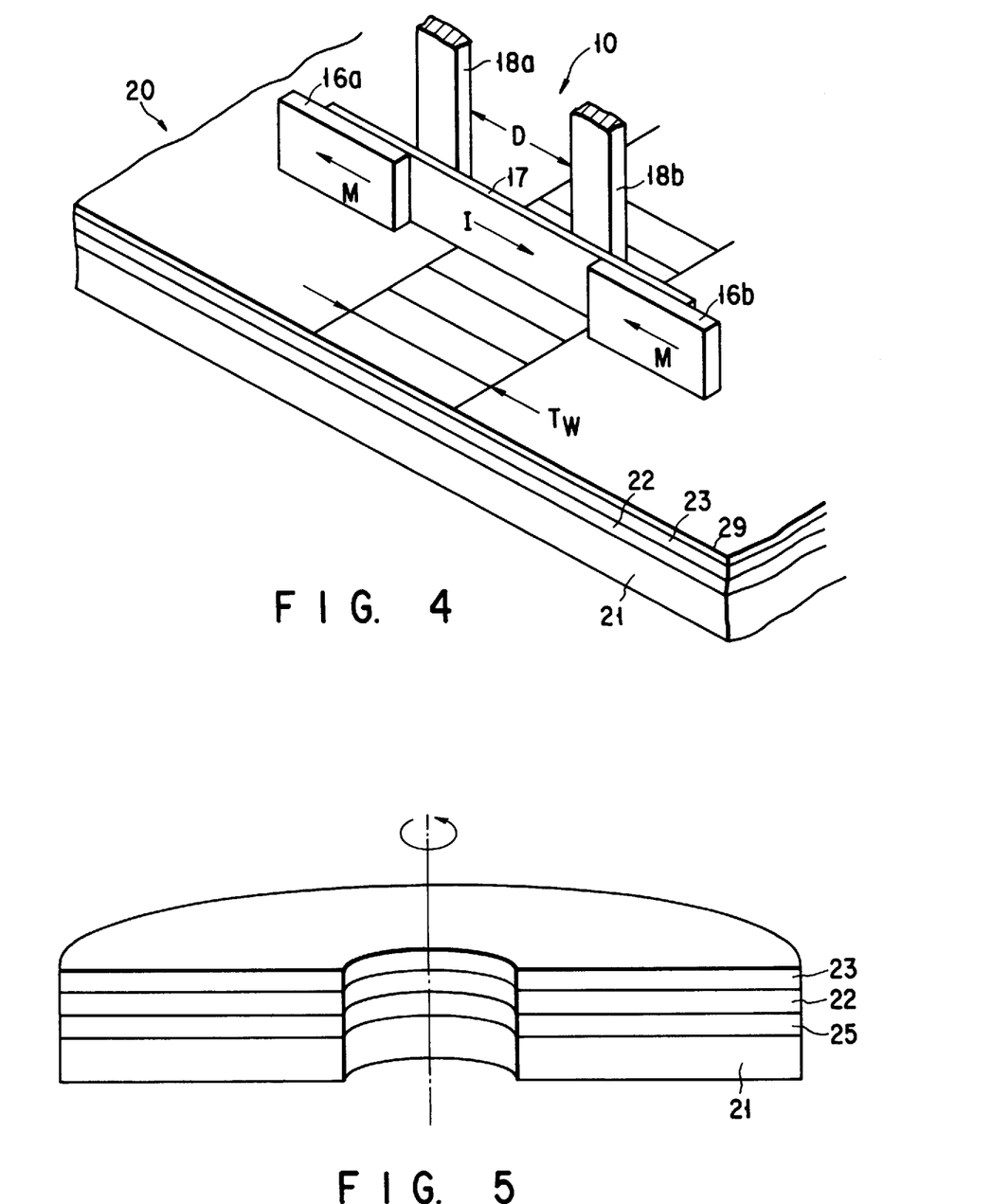
FIG. 4 is a partly cross-sectional perspective view schematically illustrating the structure of a perpendicular magnetic recording/reproducing apparatus according to a third embodiment of the present invention.
FIG. 5 is a vertical cross-sectional view schematically illustrating the structure of a perpendicular magnetic recording/reproducing apparatus according to a fourth embodiment of the present invention.

FIG. 4 presents a partly cross-sectional perspective view schematically illustrating the structure of a perpendicular magnetic recording/reproducing apparatus according to the third embodiment of the present invention. The magnetic head 10 is made of hard magnetic materials 16a and 16b of CoPt formed 0.02 μm at both ends of the MR element 17, and conductors 18a and 18b for supplying a sense current I to the MR element 17 and both hard magnetic materials 16a and 16b. The distance D between the conductors 18a and 18b defines the width TW of tracks formed on the perpendicular magnetic recording medium 20. It is preferable that the distance D between the conductors 18a and 18b and the track width TW have a relation of D>TW.

The soft magnetic back layer 22 of NiFe in the perpendicular magnetic recording medium 20 was formed 0.2 μm thick on the aluminum substrate 21, 2.5 inch in diameter and 0.635 mm thick, under an argon gas atmosphere by DC magnetron sputtering. The in-plane coercive force Hcs of the soft magnetic back layer 22 was 12 Oe in this case. The magnetic recording layer 23 of CoCrTa having a perpendicular magnetic anisotropy was formed 0.08 μm thick on the soft magnetic back layer 22 under an argon gas atmosphere by DC magnetron sputtering. The perpendicular coercive force Hch of the magnetic recording layer 23 was 1900 Oe. The insulating protective layer 29 of ZrO was formed 0.007 μm on the magnetic recording layer 23 by RF sputtering to secure a durability against the head contact.

The hard magnetic materials 16a and 16b have magnetization M in the width direction of the tracks (radial direction of the substrate) to apply a magnetic field in the track width direction in the soft magnetic back layer 22.

Since the intensity of the magnetic field applied by the hard magnetic materials 16a and 16b is about 20 Oe, higher than the coercive force Hcs of the soft magnetic back layer 22. Accordingly, the occurrence of Barkhausen noise due to the shifting of the magnetic domain wall of the soft magnetic back layer 22 can be suppressed, thus improving the signal quality, as per the previously described embodiments.

Although the soft magnetic back layer and magnetic recording layer are deposited only one surface of the substrate in the first through third embodiments, they may be deposited on the other surface of the substrate, yielding a double-side type perpendicular magnetic recording medium 20.

Although the detailed structure of the magnetic head 10 has been discussed in the foregoing descriptions of the first to third embodiments, the detailed structure of the perpendicular magnetic recording medium 20 will be discussed hereunder. Further, the discussion of the protective layer 29 will be omitted in the following description for diagrammatic simplicity.

FIG. 5 presents a vertical cross-sectional view schematically illustrating the structure of a perpendicular magnetic recording/reproducing apparatus according to the fourth embodiment of the present invention.

The perpendicular magnetic recording medium has a bias-field applying layer 25 formed of an antiferromagnetic film of FeMn, NiO or the like on a disk-shaped substrate 21 of aluminum, glass or the like, with a high-permeability magnetic layer 22 formed of Permalloy, an Fe group soft magnetic film, or Co-base amorphous soft magnetic film on the bias-field applying layer 25. Deposited on the high-permeability magnetic layer 22 is a perpendicular magnetization layer 23 of CoCr, CoPt or the like where signals are magnetically recorded.

Figure 6:
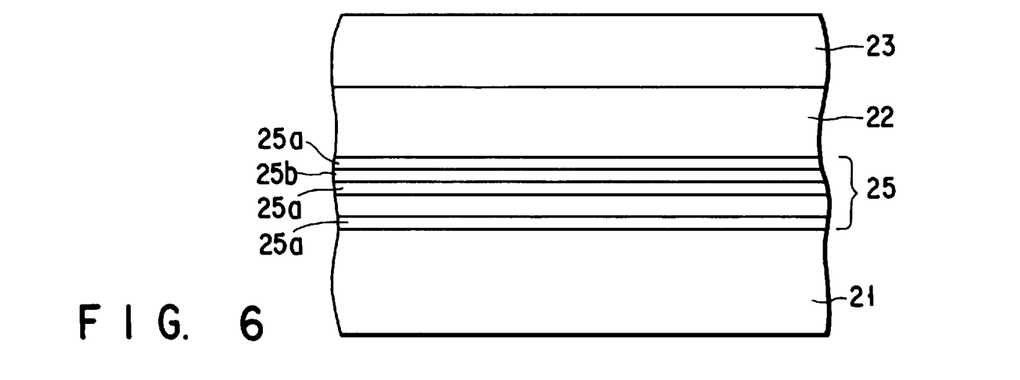
FIG. 6 is a diagram exemplifying a bias-field applying layer shown in FIG. 5.

The bias-field applying layer 25 may be formed of a high coercive force film of CoPt, CoPtCr, CoCr or the like instead of an antiferromagnetic film. The bias-field applying layer 25 may be an artificial lattice film, which has an alternate lamination of magnetic films 25a and a non-magnetic film 25b, the magnetic films 25a sandwiching the non-magnetic film 25b and being antiferromagnetically coupled. This artificial lattice film may be a lamination of n layers of (CoFe, Cu)n, (Co/Cu)n, (Fe/Cr)n, or the like.

With the above structure, the bias-field applying layer 25 and high-permeability magnetic layer 22 have a exchange coupling at their interface to apply a bias field to the high-permeability magnetic layer 22. Therefore, the generation of the magnetic domain wall in the high-permeability magnetic layer 22 can be suppressed and the occurrence of spike Barkhausen noise can be suppressed. As the perpendicular magnetization layer 23 is deposited directly on the high-permeability magnetic layer 22, there will be no interlayer originated loss at the time of signal recording/reproduction, thus ensuring high resolution and high recording and reproducing efficiencies.

At the time the bias-field applying layer 25 and high-permeability magnetic layer 22 are formed by sputtering or the like in the fourth embodiment, a bias field can be effectively applied to the high-permeability magnetic layer if an inductive magnetic anisotropy is given while applying a magnetic field in the width direction of the recording tracks on the perpendicular magnetic recording medium.

Figure 7:
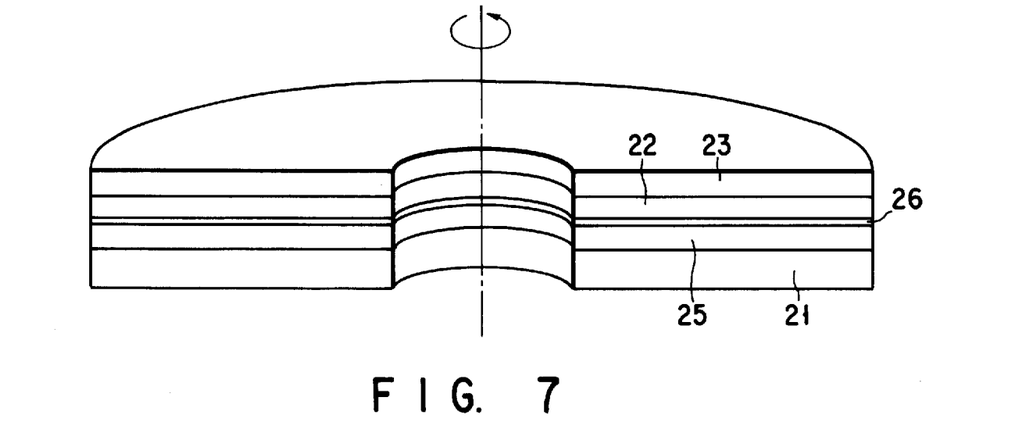
FIG. 7 is a vertical cross-sectional view schematically illustrating the structure of a perpendicular magnetic recording/reproducing apparatus according to a fifth embodiment of the present invention.

FIG. 7 presents a vertical cross-sectional view schematically illustrating the structure of a perpendicular magnetic recording/reproducing apparatus according to the fifth embodiment of the present invention.

In FIG. 7, a non-magnetic film 26 is provided between the bias-field applying layer 25 and high-permeability magnetic layer 22 formed on the substrate 21. Since the intensity of the exchange coupling at the interface between the bias-field applying layer 25 and high-permeability magnetic layer 22 differs depending on the type of the bias-field applying layer 25 in use, the intensity of the bias field applied to the high-permeability magnetic layer 22 differs accordingly. If the exchange coupling is too strong, a more than necessary bias field is applied to the high-permeability magnetic layer 22, reducing the permeability $\mu$ of the high-permeability magnetic layer 22. This will deteriorate the recording and reproducing efficiencies.

The intensity of the exchange coupling can be controlled by the non-magnetic film 26 provided between the bias-field applying layer 25 and high-permeability magnetic layer 22, so that the occurrence of Barkhausen noise can be suppressed while maintaining the optimal recording/reproducing sensitivity. The type and thickness of this non-magnetic film 26 should be selected in accordance with various conditions, such as the magnetic characteristics of the bias-field applying layer 25 and high-permeability magnetic layer 22 and their thicknesses.

Figure 8:
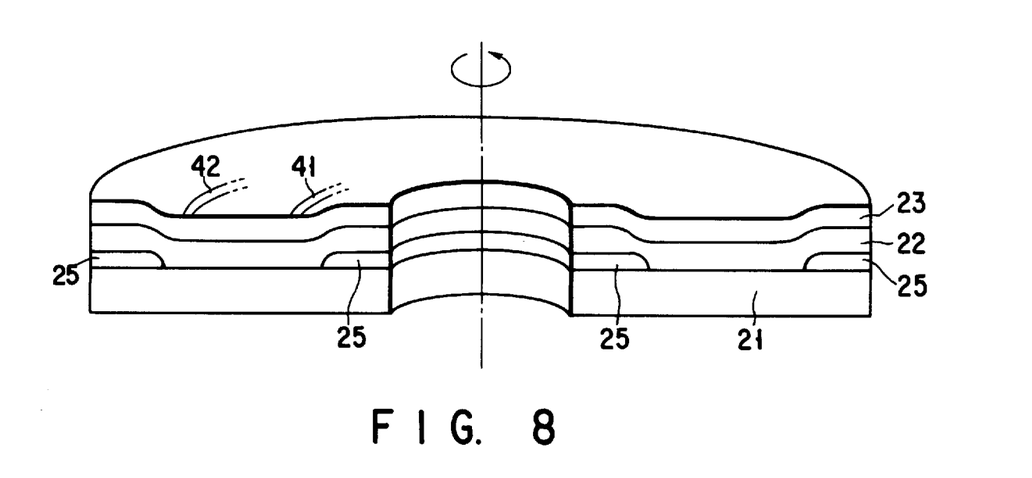
FIG. 8 is a vertical cross-sectional view schematically illustrating the structure of a perpendicular magnetic recording/reproducing apparatus according to a sixth embodiment of the present invention.

FIG. 8 presents a vertical cross-sectional view schematically illustrating the structure of a perpendicular magnetic recording/reproducing apparatus according to the sixth embodiment of the present invention.

In FIG. 8, the bias-field applying layers 25 of a ring shape are formed at predetermined associated positions outside the recording/reproducing region lying between an innermost track 41 and an outermost track 42. This perpendicular magnetic recording medium is produced by the method that will be described below. FIGS. 9A through 9D illustrate step-by-step production of the perpendicular magnetic recording medium.

Figure 9A:
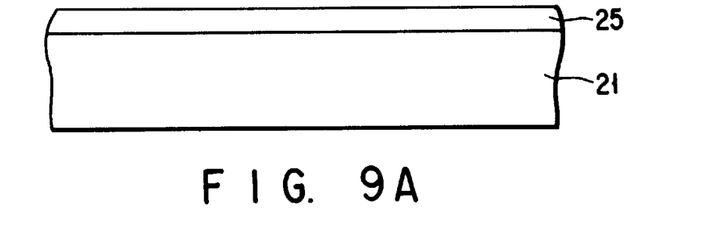
FIGS. 9A through 9D are diagrams illustrating step-by-step production of a perpendicular magnetic recording medium 20 in FIG. 8.
Figure 9B:
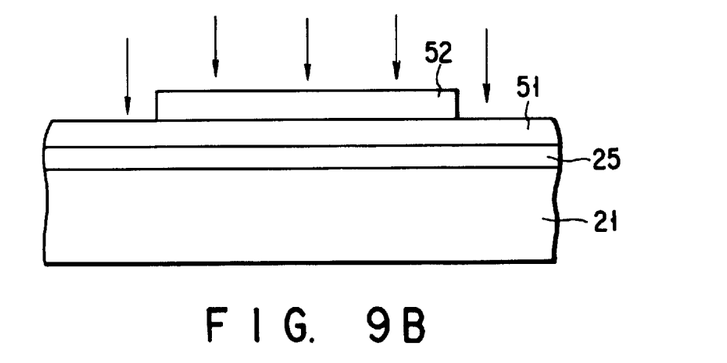
Figure 9C:
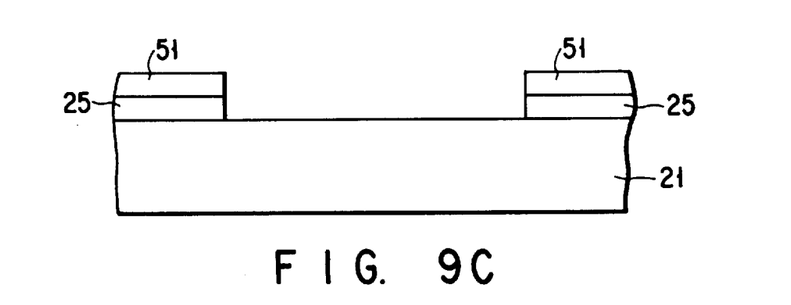
Figure 9D:
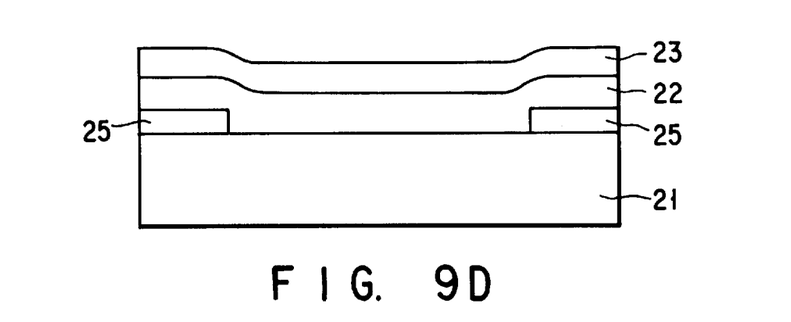

The bias-field applying layer 25 is deposited on the substrate 21 by sputtering or the like (FIG. 9A). Then, a resist 51 is coated on the bias-field applying layer 25, and that portion of the perpendicular magnetic recording medium which is to be the recording/reproducing region (for example, the region covering from the innermost track of the magnetic disk to the outermost track) is covered with a mask 52 and the resultant structure is exposed to light (FIG. 9B). The portion masked with the mask 52 is removed by etching or the like (FIG. 9C), the resist 51 is then removed, and the high-permeability magnetic layer 22 and perpendicular magnetization layer 23 are deposited by vapor deposition, sputtering or the like (FIG. 9D).

With the above structure, a bias field is applied only those portions of the high-permeability magnetic layer 22 which face the bias-field applying layers 25, thus suppressing the generation of the magnetic domain wall at those portions. The suppression of the generation of the magnetic domain wall there effectively suppresses the generation of the magnetic domain wall in the region where no bias field is formed. This can suppress Barkhausen noise which may be produced by the generation of such a magnetic domain wall.

No recording or reproduction of magnetized signals will be performed on that portion of the perpendicular magnetization layer 23 which corresponds to the region of the high-permeability magnetic layer 22 lying on the bias-field applying layer 25. As the permeability p need not be considered for that region, the strength of the exchange coupling between the bias-field applying layer 25 and high-permeability magnetic layer 22 can be enhanced. Since the permeability p does not drop in the recording/reproducing region in the above embodiment, the magnetic interaction with the magnetic head can be enhanced, thus ensuring signal recording/reproduction with a higher sensitivity and higher resolution.

Figure 10:
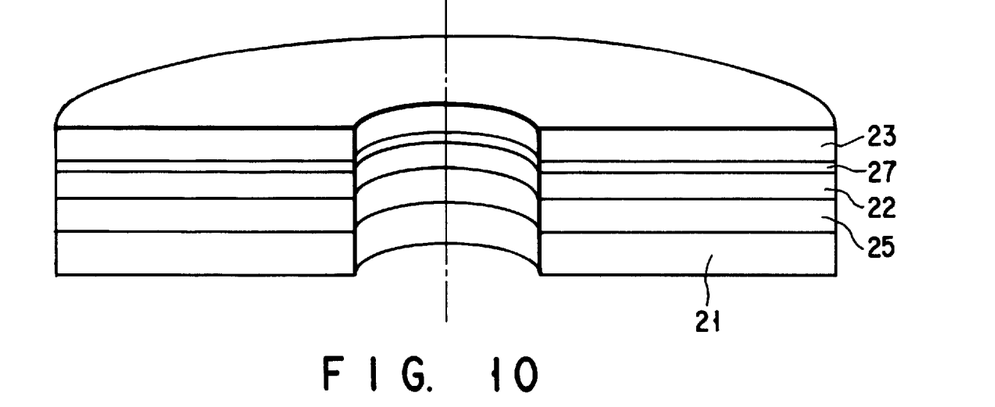
FIG. 10 is a diagram showing a modification of the perpendicular magnetic recording/reproducing apparatus according to the fifth embodiment of the present invention.

Further, the perpendicular magnetic recording medium 20 of this invention may have an antiferromagnetic film 27 also provided between the high-permeability magnetic layer 22 and perpendicular magnetization layer 23 as shown in FIG. 10. In this case, the antiferromagnetic layer 27 should be formed thin enough not to yield an interlayer originated spacing loss.

Figure 11:
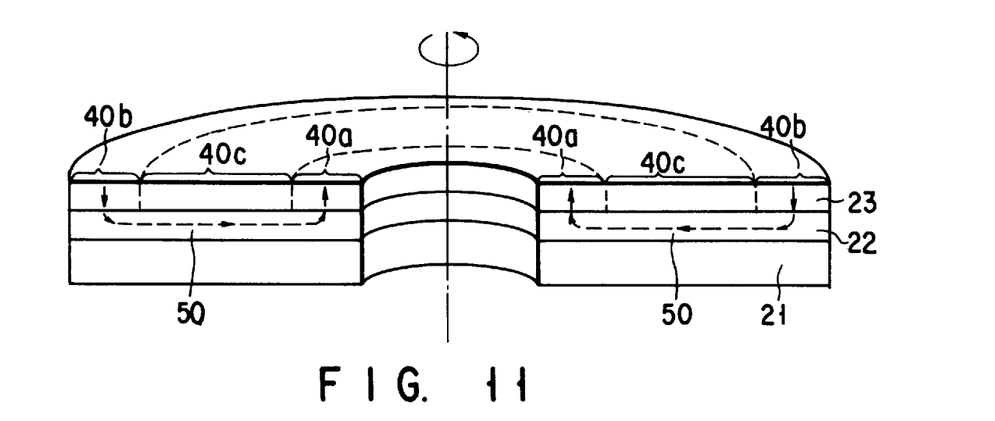
FIG. 11 is a diagram illustrating the schematic structure of a perpendicular magnetic recording/reproducing apparatus according to a seventh embodiment of the present invention.

FIG. 11 presents a diagram illustrating the schematic structure of a perpendicular magnetic recording/reproducing apparatus according to the seventh embodiment of the present invention.

The perpendicular magnetic recording medium of the seventh embodiment has the high-permeability magnetic layer 22 and perpendicular magnetization layer 23 deposited in order on the substrate 21. Perpendicular magnetization regions 40a and 40b of predetermined widths are formed at the inner track side and outer track side of the perpendicular magnetization layer 23 of the magnetic disk. The perpendicular magnetization regions 40a and 40b are perpendicularly magnetized in the opposite directions. For instance, the inner perpendicular magnetization region 40a is perpendicularly magnetized in the direction from the substrate toward the surface facing the head, while the outer perpendicular magnetization region 40b is perpendicularly magnetized in the direction from the surface facing the head toward the substrate.

When the magnetization in the high-permeability magnetic layer 22 corresponding to the perpendicular magnetization regions 40a and 40b is fixed in the track width direction of the magnetic disk (radial direction of the disk) to be difficult to shift by magnetically coupling the perpendicular magnetization regions 40a and 40b to the high-permeability magnetic layer 22 (through either the exchange coupling by exchange interaction or magnetostatic coupling), a bias field indicated by a broken line 50 is applied to the inner region of the high-permeability magnetic layer 22 which corresponds to a recording/reproducing region 40c lying between the perpendicular magnetization regions 40a and 40b in the perpendicular magnetization layer 23. This bias field can suppress the generation of the magnetic domain wall in the high-permeability magnetic layer 22 and can thus suppress the occurrence of Barkhausen noise. In addition, the permeability in the lengthwise direction of the tracks (the circumferential direction of the disk) in that area of the high-permeability magnetic layer 22 which corresponds to the position of the recording/reproducing region 40c of the perpendicular magnetization layer 23 hardly decreases, so that the recording and reproducing efficiencies will not decrease. Further, as no interlayer such as an antiferromagnetic layer is present between the high-permeability magnetic layer 22 and the perpendicular magnetization layer 23, there is no interlayer originated spacing loss at the time of signal recording/reproduction. It is therefore possible to accomplish a perpendicular magnetic recording/reproducing apparatus with high recording and reproducing efficiencies and high resolution.

FIGS. 12 through 17 illustrate other modifications of the perpendicular magnetic recording medium 20 of the perpendicular magnetic recording/reproducing apparatus according to the present invention.

Figure 12:
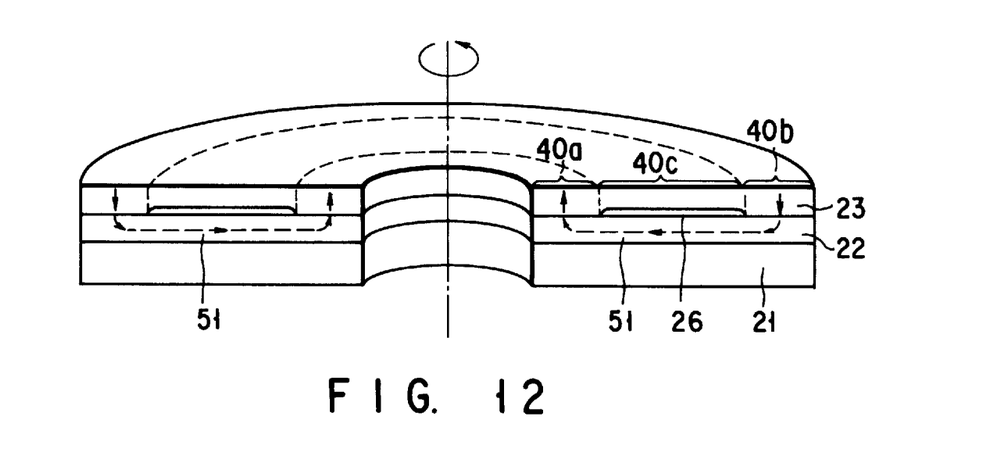
FIG. 12 is a diagram showing a first modification of the perpendicular magnetic recording/reproducing apparatus according to the present invention.

The perpendicular magnetic recording medium of FIG. 12 has a non-magnetic film 26 formed between the high-permeability magnetic layer 22 and perpendicular magnetization layer 23. That is, the non-magnetic film 26 which can cut off the exchange coupling at the interface between the high-permeability magnetic layer 22 and perpendicular magnetization layer 23 is formed at the position of that interface which corresponds to the recording/reproducing region 40c of the perpendicular magnetization layer 23.

The above structure can permit magnetostatic coupling at that portion of the interface between the high-permeability magnetic layer 22 and perpendicular magnetization layer 23 which corresponds to the recording/reproducing region 40c. Even if the high-permeability magnetic layer 22 is made thin as needed, the high-permeability magnetic layer 22 can ensure good signal recording/reproduction while preventing the magnetization in the layer 22 from being decreased by the signal magnetization.

Figure 13:
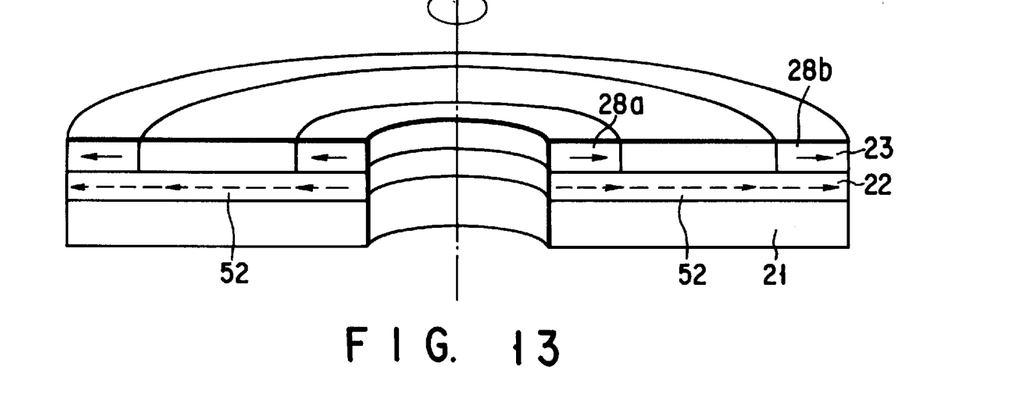
FIG. 13 is a diagram showing a second modification of the perpendicular magnetic recording/reproducing apparatus according to the present invention.

The perpendicular magnetic recording medium of FIG. 13 has the high-permeability magnetic layer 22 and perpendicular magnetization layer 23 deposited on the substrate 21. High coercive force films 28a and 28b of predetermined widths, each magnetized in the track width direction and having an orientation in the lengthwise direction, are formed at the inner track side and outer track side of the perpendicular magnetization layer 23 of the magnetic disk. The high-permeability magnetic layer 22 and high-coercive force films 28a and 28b can therefore be coupled magnetically, thus ensuring the same advantage as the case of FIG. 12.

Figure 14:
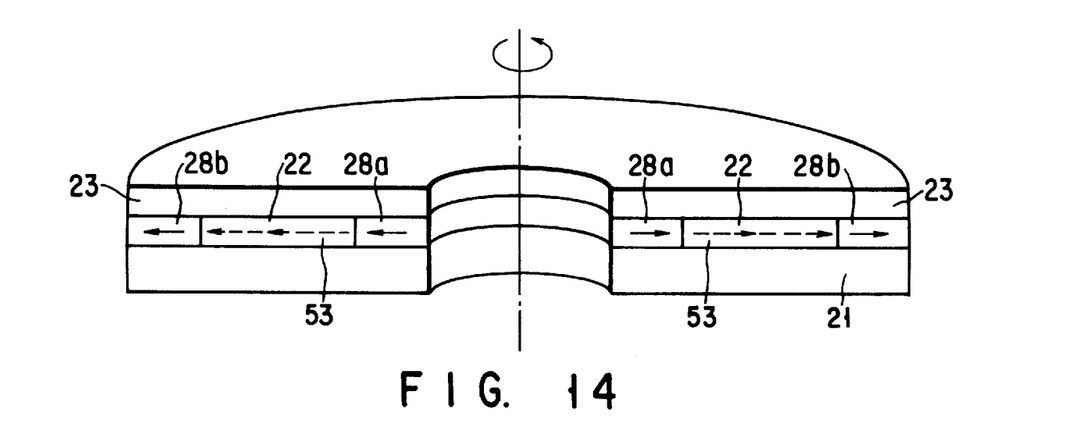
FIG. 14 is a diagram showing a third modification of the perpendicular magnetic recording/reproducing apparatus according to the present invention.

The perpendicular magnetic recording medium of FIG. 14 has high coercive force films 28a and 28b, each magnetized in the track width direction and having an orientation in the lengthwise direction, are formed at the inner track side and outer track side on the substrate 21, with the high-permeability magnetic layer 22 formed at the position corresponding to the recording/reproducing region between the high coercive force films 28a and 28b. The perpendicular magnetization layer 23 where signals are magnetically recorded or reproduced is formed on the high-permeability magnetic layer 22 and the high coercive force films 28a and 28b. In this case too, since a bias field can be applied to the high-permeability magnetic layer 22 in the direction of an arrow 53 by the magnetization of the high coercive force films 28a and 28b, the same advantage as attained in the case of FIG. 12 can be provided.

Figure 15:
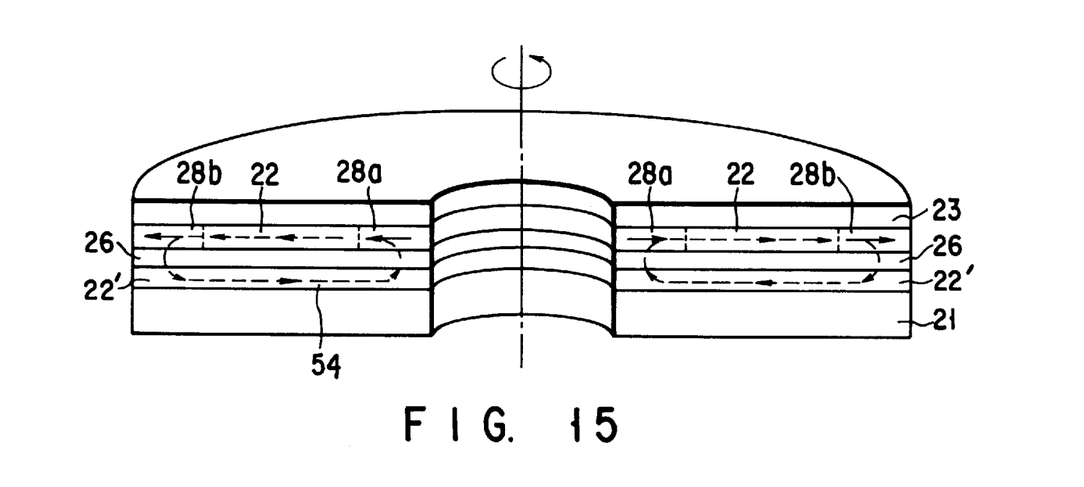
FIG. 15 is a diagram showing a fourth modification of the perpendicular magnetic recording/reproducing apparatus according to the present invention.

The perpendicular magnetic recording medium of FIG. 15 has a second high-permeability magnetic layer 22' and the non-magnetic film 26 formed on the substrate 21, with the high coercive force films 28a and 28b and the first high-permeability magnetic layer 22 sequentially deposited on this non-magnetic film 26. The perpendicular magnetization layer 23 is further deposited on the high coercive force films 28a and 28b and the first high-permeability magnetic layer 22.

When the high coercive force films 28a and 28b are magnetostatically coupled to the high-permeability magnetic layer 22', a closed magnetic path (broken line 54) with a small magnetic circuit resistance, is formed, which runs from the high coercive force film 28a, to the high-permeability magnetic layer 22, to the high coercive force film 28b, and to the high-permeability magnetic layer 22' (or in the opposite route), so that an effective bias field stronger than that of the perpendicular magnetic recording medium 20 shown in FIG. 13 can be applied.

Figure 16:
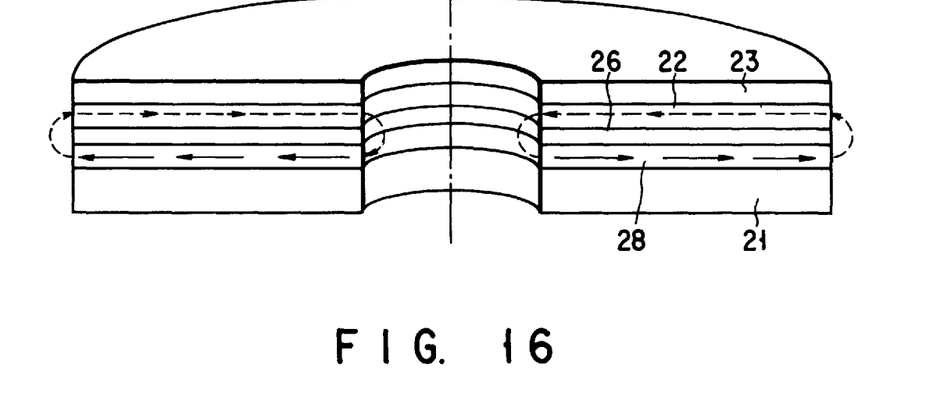
FIG. 16 is a diagram showing a fifth modification of the perpendicular magnetic recording/reproducing apparatus according to the present invention.

The perpendicular magnetic recording medium of FIG. 16 has the high coercive force film 28, the non-magnetic film 26, the high-permeability magnetic layer 22 and the perpendicular magnetization layer 23 sequentially formed on the substrate 21. As the high coercive force film 28 and the soft magnetic layer 22 are magnetostatically coupled, a bias field is applied to the high-permeability magnetic layer 22 in the track width direction.

Figure 17:
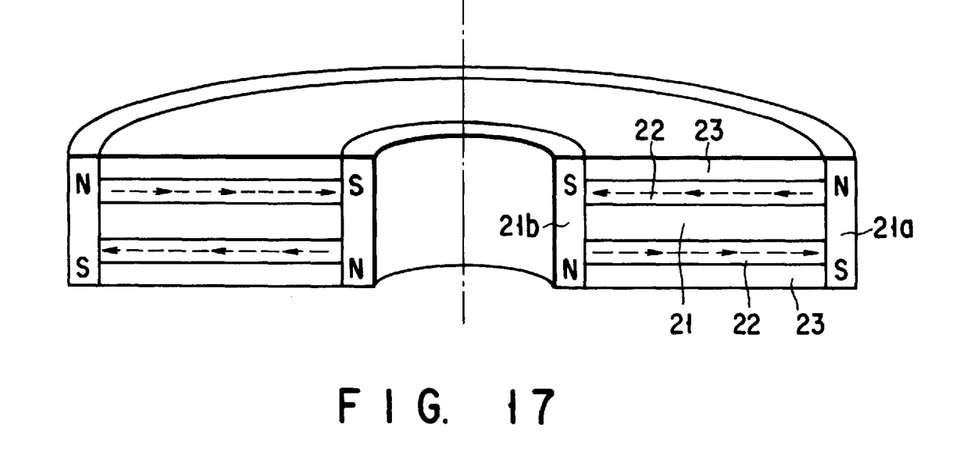
FIG. 17 is a diagram showing a sixth modification of the perpendicular magnetic recording/reproducing apparatus according to the present invention.

The perpendicular magnetic recording medium of FIG. 17 has the high coercive force film 28 and perpendicular magnetization layer 23 sequentially formed on the substrate 21. Permanent magnets 21a and 21b magnetized in the opposite directions perpendicular to the surface of the medium, are provided at both ends of the recording/reproducing region. In this modification, a bias field can be applied inside the high-permeability magnetic layer 22 in the track width direction as per the above-described embodiments. The permanent magnets 21a and 21b may be replaced with the high coercive force films 28a and 28b.

Although the perpendicular magnetization layer is so formed as to permit signal magnetization only on one side of a magnetic disk in the above-described embodiments, this layer may also be formed on the other side.

While the disk-shaped perpendicular magnetic recording medium, such as a magnetic disk, have been described in the foregoing descriptions of the individual embodiments, the present invention may be adapted for the perpendicular magnetic recording medium in a tape form, such as a magnetic tape.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A perpendicular magnetic recording/reproducing apparatus comprising:

perpendicular magnetic recording medium having a substrate, a first metal magnetic layer formed on said substrate and a second metal magnetic layer formed over said first metal magnetic layer and having a perpendicular magnetic anisotropy; and magnetic head having at least one magnetic field generating element for applying a magnetic field to a given region of said first metal magnetic layer at a time of signal reproduction, for reproducing magnetized signals with respect to said second metal magnetic layer of said perpendicular magnetic recording medium with reduced Barkhausen noise.

2. The perpendicular magnetic recording/reproducing apparatus according to claim 1, wherein said magnetic field generating element generates in said first metal magnetic layer a magnetic field having an intensity greater than the coercive force of said first metal magnetic layer, and in said second metal magnetic layer said magnetic field generating element generates a magnetic field having an intensity which is smaller than the perpendicular coercive force of the second metal magnetic layer.

3. The perpendicular magnetic recording/reproducing apparatus according to claim 1, wherein, said magnetic field generating element comprises a conductor with a cross-sectional area S, and a current density J of a current flowing through said magnetic field generating elements satisfies $$J > 2\pi dHc/S$$

where d is a distance from the center of said current with said current density J to said first metal magnetic, layer and Hc is the coercive force of said first metal magnetic layer.

4. The perpendicular magnetic recording/reproducing apparatus according to claim 3, wherein said current flowing through said magnetic field generating element is an AC current.

5. The perpendicular magnetic recording/reproducing apparatus according to claim 1, wherein said magnetic field generating element comprises a magnetized material on a surface of the magnetic head adjacent to the magnetic recording medium.

6. The perpendicular magnetic recording/reproducing apparatus according to claim 1, wherein said perpendicular magnetic recording medium further includes an intermediate layer formed between said first metal magnetic layer and said second metal magnetic layer.

7. The perpendicular magnetic recording/reproducing apparatus according to claim 1, wherein said perpendicular magnetic recording medium further includes a bias-field applying layer formed between said substrate and said first metal magnetic layer, said bias-field applying layer applying a bias magnetic field to said first metal magnetic layer.

8. The perpendicular magnetic recording/reproducing apparatus according to claim 7, wherein said perpendicular magnetic recording medium further includes a non-magnetic film formed between said bias-field applying layer and said first metal magnetic layer.

9. A perpendicular magnetic recording/reproducing apparatus comprising:

perpendicular magnetic recording medium having a substrate, a first metal magnetic layer formed on said substrate, and a second metal magnetic layer formed on said first metal magnetic layer, said second metal magnetic layer having perpendicular anisotropy for magnetically recording signals, said perpendicular magnetic recording medium having a cylindrical shape with an upper surface containing a recording/reproducing region between an inner peripheral region and an outer peripheral region with at least part of said second metal magnetic layer located at said inner peripheral region and said outer peripheral region being magnetized to provide bias fields oriented in opposite directions perpendicular to said upper surface; and magnetic heads for recording and reproducing magnetized signals with respect to said second metal magnetic layer of said perpendicular magnetic recording medium, said bias fields oriented in opposite directions being coupled to said first metal magnetic layer and providing reduced Barkhausen noise during the reproducing of said magnetized signals.

* * * * *